(12) United States Patent
Nakazawa et al.

(10) Patent No.: US 11,775,081 B2
(45) Date of Patent: Oct. 3, 2023

(54) INFORMATION PROCESSING DEVICE AND INFORMATION PROCESSING METHOD

(71) Applicant: SINTOKOGIO, LTD., Nagoya (JP)

(72) Inventors: Kazuya Nakazawa, Nagoya (JP); Takahiro Naito, Nagoya (JP); Mitsuaki Watanabe, Nagoya (JP); Tomoyoshi Kawaguchi, Nagoya (JP); Naoya Sogo, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 0 days.

(21) Appl. No.: 17/582,268

(22) Filed: Jan. 24, 2022

(65) Prior Publication Data
US 2022/0236812 A1   Jul. 28, 2022

(30) Foreign Application Priority Data

Jan. 27, 2021 (JP) .................. 2021-011237
Oct. 20, 2021 (JP) .................. 2021-171937

(51) Int. Cl.
*G06F 3/03*       (2006.01)
*G06F 11/32*    (2006.01)

(52) U.S. Cl.
CPC ............. *G06F 3/03* (2013.01); *G06F 11/324* (2013.01)

(58) Field of Classification Search
CPC .................................. G06F 3/03; G06F 11/324
See application file for complete search history.

(56) References Cited

U.S. PATENT DOCUMENTS

| 8,063,750 | B2 | 11/2011 | Knibbe |
| 9,970,757 | B2 | 5/2018 | Das et al. |
| 10,387,392 | B2 | 8/2019 | Bliss et al. |
| 10,754,329 | B2 | 8/2020 | Jundt et al. |
| 11,200,774 | B2 | 12/2021 | Erestam |
| 2010/0231363 | A1 | 9/2010 | Knibbe |

(Continued)

FOREIGN PATENT DOCUMENTS

| JP | 2007-27889 A | 2/2007 |
| JP | 2011-164966 A | 8/2011 |

(Continued)

OTHER PUBLICATIONS

U.S. Appl. No. 17/580,763, filed Jan. 21, 2022.
(Continued)

*Primary Examiner* — David E Choi
(74) *Attorney, Agent, or Firm* — Harness, Dickey & Pierce, P.L.C.

(57) ABSTRACT

The information processing device includes at least one processor which executes a first relaying process for obtaining sensor data transmitted from each of sensors included in a sensor group and providing the sensor data thus obtained to main equipment, a second relaying process for obtaining accessory equipment data transmitted from each of pieces of accessory equipment included in an accessory equipment group and providing the accessory equipment data thus obtained to the main equipment, and a displaying process for causing a display device to display at least any of the sensor data obtained in the first relaying process, information obtained from the sensor data, the accessory equipment data obtained in the second relaying process, and information obtained from the accessory equipment data.

12 Claims, 11 Drawing Sheets

(56) References Cited

U.S. PATENT DOCUMENTS

| | | |
|---|---|---|
| 2012/0208605 A1 | 8/2012 | Strauss et al. |
| 2015/0192414 A1 | 7/2015 | Das et al. |
| 2015/0251102 A1 | 9/2015 | Kuo |
| 2017/0124633 A1 | 5/2017 | Natarajan et al. |
| 2017/0141933 A1 | 5/2017 | Senda et al. |
| 2017/0337226 A1 | 11/2017 | Bliss et al. |
| 2018/0158314 A1 | 6/2018 | Larsson |
| 2018/0217581 A1 | 8/2018 | Jundt et al. |
| 2019/0088069 A1 | 3/2019 | Erestam |
| 2019/0314243 A1* | 10/2019 | MacCallum ........ H04L 12/2809 |
| 2020/0334763 A1* | 10/2020 | Luciani ................... H04W 4/90 |
| 2020/0405228 A1* | 12/2020 | Svanegaard ........... A61B 5/002 |
| 2022/0043702 A1* | 2/2022 | Haines ................ G06F 11/0787 |
| 2022/0236812 A1* | 7/2022 | Nakazawa ............ G06F 11/324 |

FOREIGN PATENT DOCUMENTS

| | | |
|---|---|---|
| JP | 4766926 B2 | 9/2011 |
| JP | 2017-092792 A | 5/2017 |
| JP | 2018-536228 A | 12/2018 |

OTHER PUBLICATIONS

U.S. Appl. No. 17/582,121, filed Jan. 24, 2022.
U.S. Appl. No. 17/581,009, filed Jan. 21, 2022.
Extended European Search Report for EP Application No. 22153409.2 dated Jun. 17, 2022.
Extended European Search Report for EP Application No. 22153413.4 dated Jun. 17, 2022.
Extended European Search Report for EP Application No. 22153281.5 dated Jun. 15, 2022.
Extended European Search Report for EP Application No. 22153296.3 dated Jun. 15, 2022.
U.S. Office Action for corresponding U.S. Appl. No. 17/581,009 dated May 10, 2023.

* cited by examiner

FIG. 3

| Sensor data set D1 | Configuration information 91 | Status information 92 | Output information 93 | Monitor information 94 |
|---|---|---|---|---|
| Head+00 | Communication information offset value | Comm.+000 Keep-alive signal | Data+000 First sensor slave unit data | Mon.+000 First sensor slave unit determination result |
| Head+01 | Output information offset value | Comm.+001 Reserve | Data+001 First sensor slave unit data | Mon.+001 First sensor slave unit threshold value |
| ... | | Comm.+002 Sensor master unit communication status | ... | ... |
| Head+11 | Sensor master unit code | ... | Data+004 Second sensor slave unit data | Mon.+009 Second sensor slave unit determination result |
| ... | | Comm.+013 First sensor slave unit communication status | ... | ... |
| Head+30 | First sensor slave unit code | ... | | |
| ... | | | | |

FIG. 4

| Word number of sensor group data | Memory address of main equipment PLC |
|---|---|
| Head+01 | AAA~A'A'A' |
| Head+02 | BBB~B'B'B' |
| ⋮ | ⋮ |
| Comm.+001 | CCC~C'C'C' |
| Comm.+002 | DDD~D'D'D' |
| ⋮ | ⋮ |
| Data+001 | EEE~E'E'E' |
| Data+002 | FFF~F'F'F' |
| ⋮ | ⋮ |
| Mon.+001 | GGG~G'G'G' |
| Mon.+002 | HHH~H'H'H' |
| ⋮ | ⋮ |

FIG. 5

Equipment data set D2

| Configuration information | | Status information | | Output information | | Input information | | Monitor information | |
|---|---|---|---|---|---|---|---|---|---|
| Head+00 | Status information offset value | Comm.+000 | Keep-alive signal | S_Data+000 | Accessory equipment integrated information | O_Data+000 | Accessory equipment integrated command | Mon.+000 | First accessory equipment determination result |
| Head+01 | Output information offset value | Comm.+001 | Low battery signal | S_Data+001 | First accessory equipment operation information | O_Data+001 | First accessory equipment command signal | Mon.+001 | First accessory equipment threshold value |
| ... | Number of pieces of accessory equipment | Comm.+002 | First accessory equipment use status | ... | | ... | | ... | |
| Head+11 | First accessory equipment code | ... | | S_Data+003 | First accessory equipment analog output | O_Data+003 | First accessory equipment command value | Mon.+017 | Second accessory equipment determination result |
| Head+12 | | ... | | ... | | ... | | Mon.+018 | Second accessory equipment threshold value |

FIG. 6

| Word number of accessory equipment group data | Memory address of main equipment PLC |
|---|---|
| Head+01 | QQQ~Q'Q'Q' |
| Head+02 | RRR~R'R'R' |
| ⋮ | ⋮ |
| Comm.+001 | SSS~S'S'S' |
| Comm.+002 | TTT~T'T'T' |
| ⋮ | ⋮ |
| S_Data+001 | UUU~U'U'U' |
| S_Data+002 | VVV~V'V'V' |
| ⋮ | ⋮ |
| O_Data+001 | WWW~W'W'W' |
| O_Data+002 | XXX~X'X'X' |
| ⋮ | ⋮ |
| Mon.+001 | YYY~Y'Y'Y' |
| Mon.+002 | ZZZ~Z'Z'Z' |
| ⋮ | ⋮ |

M2

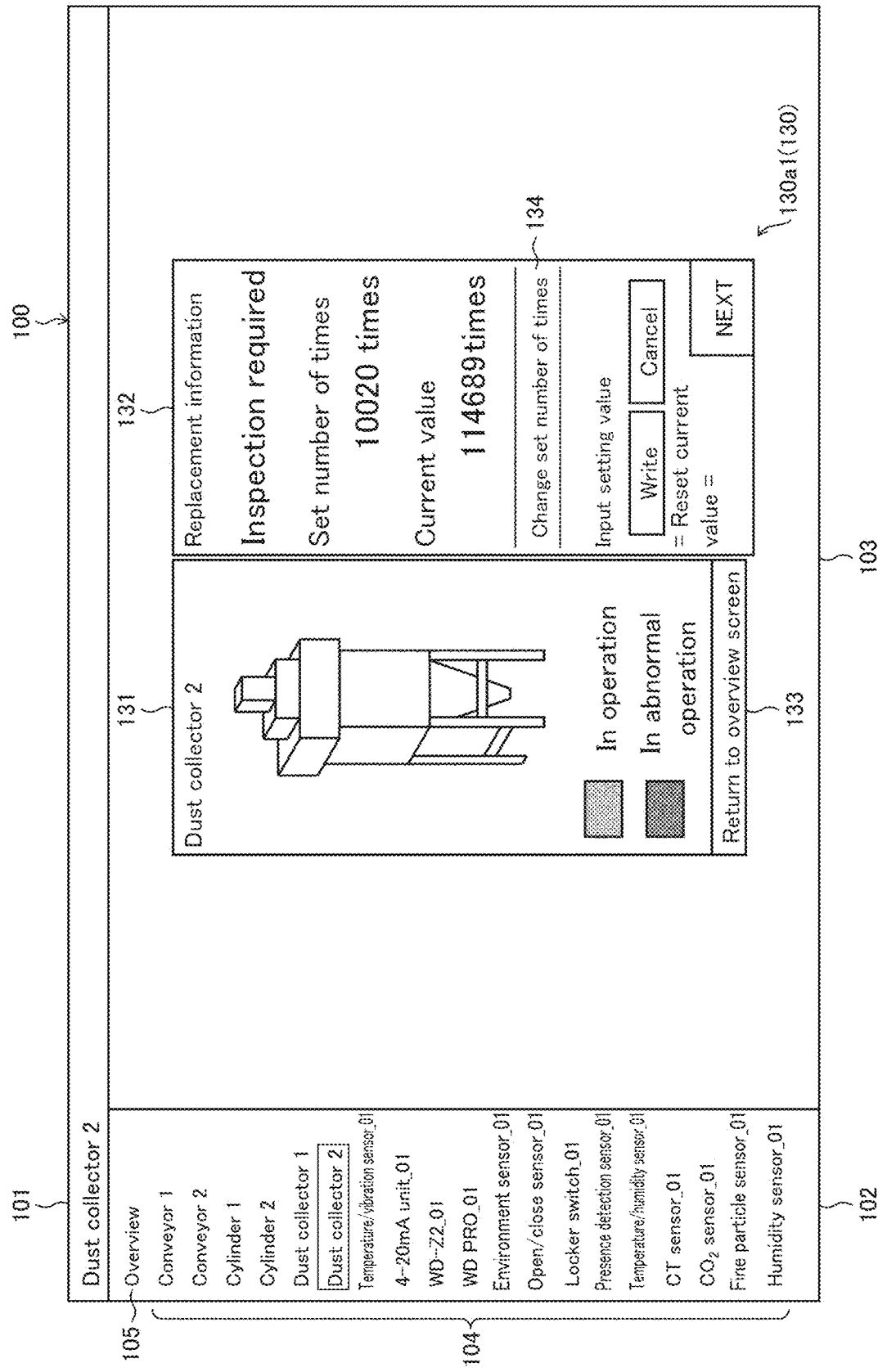

INFORMATION PROCESSING DEVICE AND INFORMATION PROCESSING METHOD

This Nonprovisional application claims priority under 35 U.S.C. § 119 on Patent Application No. 2021-011237 filed in Japan on Jan. 27, 2021 and on Patent Application No. 2021-171937 filed in Japan on Oct. 20, 2021, the entire contents of which are hereby incorporated by reference.

TECHNICAL FIELD

The present invention relates to an information processing device and an information processing method.

BACKGROUND ART

For example, Patent Literature 1 discloses a communication system in which a host computer including a display device is connected with a plurality of processing apparatuses each of which includes a programmable logic controller (PLC). The host computer obtains information pertaining to a processing apparatus from the processing apparatus, and causes the display device to display the obtained information.

CITATION LIST

Patent Literature

[Patent Literature 1]
Japanese Patent Application Publication, Tokukai, No. 2017-92792

SUMMARY OF INVENTION

Technical Problem

In a production site, a technique is used in which PLC incorporated in equipment is operated based on data obtained from a plurality of sensors and a plurality of pieces of accessory equipment. As a form of connecting the plurality of sensors and the plurality of pieces of accessory equipment to the equipment, a form of connecting a plurality of sensors and a plurality of pieces of accessory equipment to equipment via a relay device is known.

However, in a case where the communication system disclosed in Patent Literature 1 is used in the form of connecting a plurality of sensors and a plurality of pieces of accessory equipment to equipment via a relay device, it is necessary to additionally provide a separate host computer. Therefore, there has been a problem of an increase in equipment cost.

An object of an aspect of the present invention is to prevent an increase in equipment cost.

Solution to Problem

In order to attain the object, an information processing device in accordance with an aspect of the present invention includes at least one processor, the at least one processor executing a first relaying process for obtaining sensor data transmitted from each of sensors included in a sensor group and providing the sensor data thus obtained to main equipment, a second relaying process for obtaining accessory equipment data transmitted from each of pieces of accessory equipment included in an accessory equipment group and providing the accessory equipment data thus obtained to the main equipment, and a displaying process for causing a display device to display at least any of the sensor data obtained in the first relaying process, information obtained from the sensor data, the accessory equipment data obtained in the second relaying process, and information obtained from the accessory equipment data.

In order to attain the object, an information processing method in accordance with an aspect of the present invention includes a first relaying process for obtaining, by at least one processor, sensor data transmitted from each of sensors included in a sensor group and providing, by the at least one processor, the sensor data thus obtained to main equipment, a second relaying process for obtaining, by the at least one processor, accessory equipment data transmitted from each of pieces of accessory equipment included in an accessory equipment group and providing, by the at least one processor, the accessory equipment data thus obtained to the main equipment, and a displaying process for causing, by the at least one processor, a display device to display at least any of the sensor data obtained in the first relaying process, information obtained from the sensor data, the accessory equipment data obtained in the second relaying process, and information obtained from the accessory equipment data.

Advantageous Effects of Invention

According to an aspect of the present invention, it is possible to prevent an increase in equipment cost.

BRIEF DESCRIPTION OF DRAWINGS

FIG. 3 is a diagram illustrating a configuration of sensor data stored in a memory of the information processing device illustrated in FIG. 1.

FIG. 4 is a diagram illustrating a configuration of a sensor address map stored in the memory of the information processing device illustrated in FIG. 1.

FIG. 5 is a diagram illustrating a configuration of equipment data stored in the memory of the information processing device illustrated in FIG. 1.

FIG. 6 is a diagram illustrating a configuration of an equipment address map of equipment data stored in the memory of the information processing device illustrated in FIG. 1.

FIG. 11 is a diagram illustrating an example of an accessory equipment screen which the information processing device illustrated in FIG. 1 causes the display device to display.

DESCRIPTION OF EMBODIMENTS

An information processing device in accordance with the present application is a device for relaying communication between sensors included in a sensor group and main equipment, and relaying communication between pieces of accessory equipment included in an accessory equipment group and the main equipment. The following description will discuss details of an information processing device in accordance with the present embodiment with reference to the drawings.

(Appearance of Information Processing Device)

Figure 1:
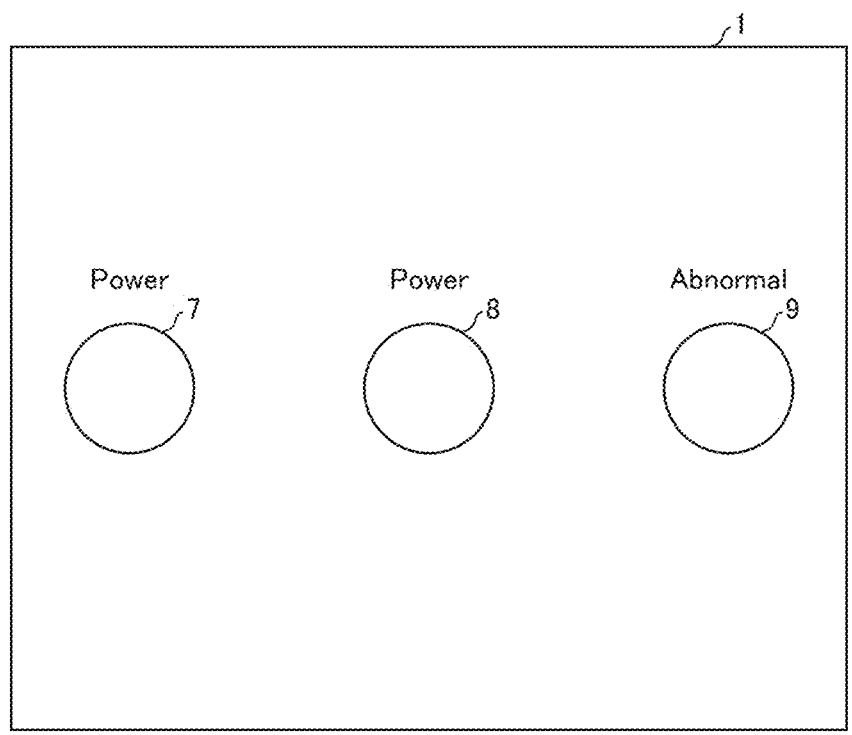
FIG. 1 is a front view illustrating an appearance of an information processing device in accordance with an embodiment of the present invention.

The following description will discuss an appearance of an information processing device 1 in accordance with an embodiment of the present invention with reference to FIG. 1. FIG. 1 is a front view illustrating an appearance of the information processing device 1.

As illustrated in FIG. 1, the information processing device 1 includes a power source button 7, a power source pilot lamp 8, and an abnormality pilot lamp 9.

The power source button 7 is a button for starting or stopping the information processing device 1. When a user presses the power source button 7 in a state in which the information processing device 1 is stopped, the information processing device 1 starts operating. When the user presses the power source button 7 in a state in which the information processing device 1 is in operation, the information processing device 1 stops. The power source pilot lamp 8 is a pilot lamp for indicating that the information processing device 1 is in operation. In a state in which the information processing device 1 is in operation, the power source pilot lamp 8 is on. In a state in which the information processing device 1 is stopped, the power source pilot lamp 8 is off. The abnormality pilot lamp 9 is a pilot lamp for indicating that an abnormality is occurring in the information processing device 1. In a state in which the information processing device 1 is in normal operation, the abnormality pilot lamp 9 is off. In a state in which the information processing device 1 is not in normal operation, the abnormality pilot lamp 9 is on. The abnormality pilot lamp 9 can be configured to be turned on when an abnormality occurs in the sensor or the accessory equipment that is connected to the information processing device 1.

(Configuration of Information Processing System Including Information Processing Device)

Figure 2:
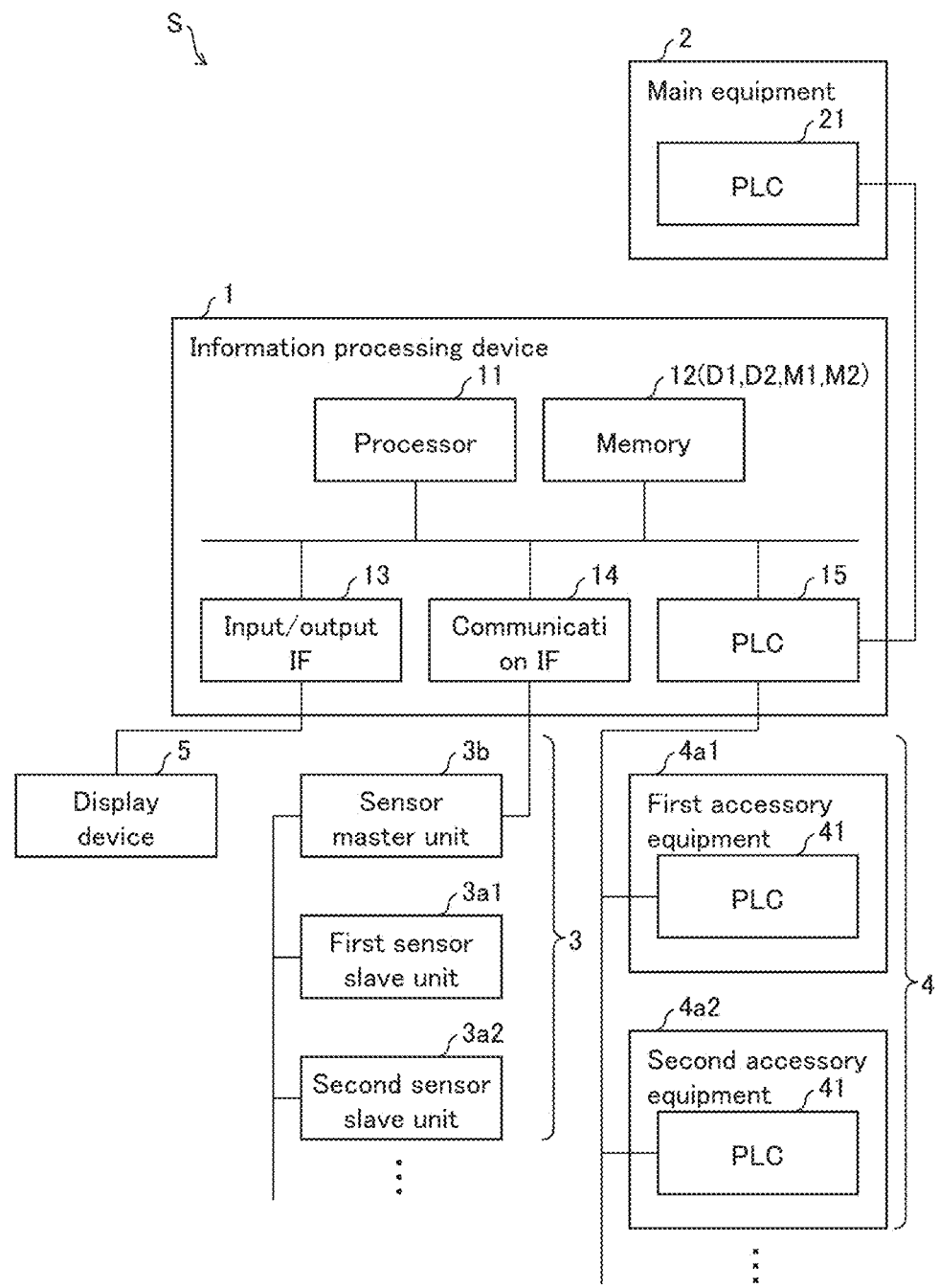
FIG. 2 is a block diagram illustrating a configuration of the information processing device illustrated in FIG. 1 and peripheral devices thereof.

The following description will discuss a configuration of an information processing system S including the information processing device 1 with reference to FIG. 2. FIG. 2 is a block diagram illustrating the configuration of the information processing system S.

The information processing system S includes main equipment 2, a sensor group 3, an accessory equipment group 4, and a display device 5 in addition to the information processing device 1.

The main equipment 2 is a device which plays a main role in a production line. The main equipment 2 can be, for example, a molding machine for forming a mold. The main equipment 2 includes a programmable logic controller (PLC) 21. The PLC 21 controls components of the main equipment 2 based on sensor data obtained, via the information processing device 1, from sensors constituting the sensor group 3 and based on pieces of equipment data obtained, via the information processing device 1, from pieces of accessory equipment constituting the accessory equipment group 4.

The sensor group 3 includes a plurality of sensor slave units 3a1, 3a2, . . . (an example of "sensors" in claims) and a sensor master unit 3b. Hereinafter, when the sensor slave units 3a1, 3a2, . . . are not individually identified, the sensor slave unit is referred to as "sensor slave unit 3a".

The sensor slave unit 3a is a device for detecting surrounding statuses of the sensor slave unit 3a, e.g., a status of the main equipment 2, a surrounding status of the main equipment 2, a status of accessory equipment 4a, a surrounding status of the accessory equipment 4a, a status of a raw material, a status of an intermediate product, or a status of a product. The sensor slave unit 3a can be, for example, an open/close sensor, a temperature sensor, PATLITE (registered trademark), or the like. The sensor slave unit 3a transmits, to the sensor master unit 3b, a detection value of the sensor slave unit 3a along with status information of the sensor slave unit 3a as sensor data. Here, the status information of the sensor slave unit 3a indicates, for example, a usage status of the sensor slave unit 3a, presence or absence of a monitoring function, a communication status, radio field intensity, or a remaining battery capacity. The sensor slave unit 3a is wirelessly connected to the sensor master unit 3b via, for example, EnOcean (registered trademark), ZigBee (registered trademark), Bluetooth Low Energy (registered trademark), or the like.

Note that there is a sensor device which has a plurality of sensor functions, e.g., a temperature/humidity sensor which detects both a temperature and humidity. In this case, each of sensor functions of a sensor device is dealt with as the sensor slave unit 3a. Therefore, a plurality of sensor slave units 3a can correspond to a single sensor device.

The sensor master unit 3b is a device for relaying communication between each of the sensor slave units 3a and the information processing device 1. The sensor master unit 3b transmits, to the information processing device 1, detection values and status information of the sensor slave units 3a that are connected to the sensor master unit 3b along with status information of the sensor master unit 3b as sensor data. Here, the status information of the sensor master unit 3b indicates, for example, a communication status and the number of times of data obtainment of the sensor master unit 3b. The sensor master unit 3b is connected to the information processing device 1 via wired connection by, for example, Ethernet (registered trademark).

The accessory equipment group 4 is constituted by a plurality of pieces of accessory equipment 4a1, 4a2, and so forth. Hereinafter, when the pieces of accessory equipment 4a1, 4a2, . . . are not individually identified, the accessory equipment is referred to as "accessory equipment 4a".

The accessory equipment 4a is a device for assisting the main equipment 2. The accessory equipment 4a can be, for example, a conveyor, a cylinder, a dust collector, or the like. The accessory equipment 4a includes a PLC 41. The PLC 41 of each of pieces of accessory equipment 4a controls components of that accessory equipment 4a. The PLC 41 of each of the pieces of accessory equipment 4a transmits, to the information processing device 1, digital output and analog output of that accessory equipment 4a along with status information of that accessory equipment 4a as equipment data. Here, the digital output of the accessory equipment 4a is also called "operation signal" and indicates, for example, whether or not automatic operation is available, whether or not the equipment is in automatic operation, whether or not an abnormality is occurring, or whether or not the equipment is in emergency stop. The analog output of the accessory equipment 4a indicates, for example, a feeding speed of a conveyor, operation pressure of a cylinder, an airflow rate of a dust collector, power consumption, or the like. The status information of the accessory equipment 4a indicates, for example, a usage status of the accessory equipment 4a, presence or absence of a monitoring function, or a communication status. The accessory equipment 4a is connected to the information processing device 1 via wired connection by, for example, CC-Link (registered trademark).

The information processing device 1 is a device for relaying communication between the main equipment 2 and the sensor group 3, and communication between the main equipment 2 and the accessory equipment group 4. The information processing device 1 includes a processor 11, a memory 12, an input/output IF 13, a communication IF 14, and a PLC 15, as illustrated in FIG. 2. The processor 11, the memory 12, the input/output IF 13, the communication IF 14, and the PLC 15 are connected to each other via buses. The information processing device 1 can be realized, for example, by adding the PLC 15 to a small single board computer such as Raspberry Pi (registered trademark).

In the memory 12, a sensor data set D1, an equipment data set D2, a sensor address map M1, and an equipment address map M2 are stored together with an information processing program P. The processor 11 refers to the sensor data set D1, the equipment data set D2, the sensor address map M1, and the equipment address map M2, and executes an information processing method (described later) in accordance with the information processing program P. Examples of devices that can be used as the processor 11 include a central processing unit (CPU). Examples of devices that can be used as the memory 12 include a flash memory.

The input/output IF 13 is an interface for connecting the display device 5. As the input/output IF 13, for example, high-definition multimedia interface (HDMI) (registered trademark) is used. The communication IF 14 is an interface for communicating with the sensor master unit 3b. For example, an Ethernet interface is used as the communication IF 14. The PLC 15 is a controller for communicating with (the PLC 21 of) the main equipment 2 and (the PLC 41 of) the accessory equipment 4a. The PLC can access the equipment data set D2 and the equipment address map M2 via the busses. The PLC 15 is connected to (the PLC 21 of) the main equipment 2 and to (the PLC 41 of) the accessory equipment 4a by CC-Link.

(Configurations of Sensor Data Set and Sensor Address Map)

A configuration of the sensor data set D1 stored in the memory 12 of the information processing device 1 will be described with reference to FIG. 3. FIG. 3 is a diagram illustrating the configuration of the sensor data set D1.

As illustrated in FIG. 3, the sensor data set D1 is constituted by configuration information 91, status information 92, output information 93, and monitor information 94. Pieces of information constituting the configuration information 91, the status information 92, the output information 93, and the monitor information 94 are managed with consecutive word numbers. In FIG. 3, a leading portion of word number of the configuration information 91 is "Head", a leading portion of word number of the status information 92 is "Comm.", a leading portion of word number of the output information 93 is "Data", and a leading portion of word number of the monitor information 94 is "Mon.", and each of the leading portions indicates content of information corresponding to that word number.

The configuration information 91 is information indicating a configuration of the sensor group 3. The configuration information 91 includes, for example, the number of sensor master units 3b, a type code and an IP address of each sensor master unit 3b, the number of sensor slave units 3a connected to each sensor master unit 3b, the total number of sensor slave units 3a, and a type code of each sensor slave unit 3a. For example, the configuration information 91 may be set by a manufacturer prior to shipment of the information processing device 1, or may be set by a user after shipment of the information processing device 1. An offset value of a leading word number of each of the status information 92, the output information 93, and the monitor information 94 (i.e., a difference from a leading word number of the configuration information 91), system information of the information processing device 1, and the like may be included in the configuration information 91.

The status information 92 is a set of status information of each of the sensor slave units 3a and status information of the sensor master unit 3b. The status information of each of the sensor slave units 3a is, as described above, obtained from that sensor slave unit 3a via the sensor master unit 3b as sensor data. The status information of the sensor master unit 3b is obtained from the sensor master unit 3b as described above. The status information 92 may include a keep-alive signal of the information processing system S, sensor slave unit integrated information in which pieces of status information of all the sensor slave units 3a are integrated, and/or the like. The sensor slave unit integrated information includes, for example, information indicating whether or not communication statuses of all the sensor slave units 3a are normal, and information indicating whether or not remaining battery capacities of all the sensor slave units 3a are normal.

The output information 93 is a set of detection values of the sensor slave units 3a. The detection value of each of the sensor slave units 3a is obtained as sensor data from that sensor slave unit 3a, as described above.

The monitor information 94 is a set of a determination condition and a determination result pertaining to each of the sensor slave units 3a. The determination condition pertaining to each of the sensor slave units 3a is represented, for example, by a threshold value. In this case, the determination result pertaining to each of the sensor slave units 3a is given as a result of comparing the detection value of that sensor slave unit 3a with the threshold value. The determination condition pertaining to each of the sensor slave units 3a may be set by a manufacturer prior to shipment of the information processing device 1, or may be set by a user after shipment of the information processing device 1. The determination result pertaining to each of the sensor slave units 3a is derived from the information processing device 1 each time the detection value of that sensor slave unit 3a is updated.

A configuration of the sensor address map M1 as address information stored in the memory 12 of the information processing device 1 will be described with reference to FIG. 4. FIG. 4 is a diagram illustrating the configuration of the sensor address map M1.

The sensor address map M1 is a table in which word numbers assigned to respective pieces of information included in the sensor data set D1 are associated with addresses on a memory of the PLC 21 provided in the main equipment 2.

The processor 11 of the information processing device 1 reads out pieces of information included in the sensor data set D1 as the configuration information 91, the status information 92, the output information 93, and the monitor information 94 from the memory 12 of the information processing device 1, and writes the information to the memory of the PLC 21 provided in the main equipment 2. At this time, the processor 11 of the information processing device 1 determines, in accordance with the sensor address map M1, a region on the memory of the PLC 21 to which each piece of information is to be written. For example, in the sensor address map M1, a word number Data+001 is associated with addresses EEE through E'E'E'. Therefore, the processor 11 of the information processing device 1 writes detection values of a first sensor slave unit, to which the word number Data+001 is assigned in the sensor data set D1, to regions to which the addresses EEE through E'E'E' are assigned in the memory of the PLC 21.

The processor 11 of the information processing device 1 may write sensor data obtained from the sensors constituting the sensor group 3 to the memory of the PLC 21 provided in the main equipment 2 in accordance with the information processing program P. In this case, address information equivalent to the foregoing sensor address map M1 is included inside the information processing program P.

(Configurations of Equipment Data Set and Equipment Address Map)

A configuration of the equipment data set D2 stored in the memory 12 of the information processing device 1 will be described with reference to FIG. 5. FIG. 5 is a diagram illustrating the configuration of the equipment data set D2.

As illustrated in FIG. 5, the equipment data set D2 is constituted by configuration information 95, status information 96, output information 97, input information 98, and monitor information 99. Pieces of information constituting the configuration information 95, the status information 96, the output information 97, the input information 98, and the monitor information 99 are managed with consecutive word numbers. In FIG. 5, a leading portion of word number of the configuration information 95 is "Head", a leading portion of word number of the status information 96 is "Comm.", a leading portion of word number of the output information 97 is "S_data", a leading portion of word number of the input information 98 is "O_data", and a leading portion of word number of the monitor information 99 is "Mon.", and each of the leading portions indicates content of information corresponding to that word number.

The configuration information 95 is information indicating a configuration of the accessory equipment group 4. The configuration information 95 includes, for example, the number of pieces of the accessory equipment 4*a* and a type code of each piece of the accessory equipment 4*a*. An offset value of a leading word number of each of the status information 96, the output information 97, the input information 98, and the monitor information 99 (i.e., a difference from a leading word number of the configuration information 95), system information of the information processing device 1, and the like may be included in the configuration information 95.

The status information 96 is a set of pieces of status information of the pieces of accessory equipment 4*a*. The status information of each piece of the accessory equipment 4*a* is obtained as the equipment data from that piece of accessory equipment 4*a*, as described above. The status information 96 may include a keep-alive signal of the information processing system S, a low battery signal of the information processing device 1, and/or the like.

The output information 97 is a set of digital output and analogue output of each piece of the accessory equipment 4*a*. The digital output and analogue output of each piece of the accessory equipment 4*a* are obtained as the equipment data from that piece of accessory equipment 4*a*, as described above. The output information 97 may include accessory equipment integrated information in which digital outputs (operation signals) of all pieces of the accessory equipment 4*a* are integrated. The accessory equipment integrated information includes, for example, information indicating whether or not all pieces of accessory equipment 4*a* are normal, and information indicating whether or not all pieces of the accessory equipment 4*a* can be automatically operated.

The input information 98 is a set of digital input and analog input of each piece of the accessory equipment 4*a*. The digital input of each piece of the accessory equipment 4*a* is also called "command signal", and represents a command to that piece of accessory equipment 4*a*. The analog input of each piece of the accessory equipment 4*a* is also called "command value", and represents a command value to that piece of accessory equipment 4*a*. The digital input and analog input of each piece of the accessory equipment 4*a* are obtained from the PLC 21 of the main equipment 2. The input information 98 may include an accessory equipment integrated command in which command signals for all pieces of the accessory equipment 4*a* are integrated. The accessory equipment integrated command includes, for example, an auto-start command for all pieces of accessory equipment that gives an instruction on auto-start to all pieces of the accessory equipment 4*a*, and an auto-stop command for all pieces of accessory equipment that gives an instruction on auto-stop to all pieces of the accessory equipment 4*a*.

The monitor information 99 is a set of a determination condition and a determination result pertaining to each piece of the accessory equipment 4*a*. The determination condition pertaining to each piece of the accessory equipment 4*a* is represented, for example, by a threshold value. In this case, the determination result pertaining to each piece of the accessory equipment 4*a* is given as a result of comparing the digital output of that piece of accessory equipment 4*a* with the threshold value. The determination condition pertaining to each piece of the accessory equipment 4*a* may be set by a manufacturer prior to shipment of the information processing device 1, or may be set by a user after shipment of the information processing device 1. The determination result pertaining to each piece of the accessory equipment 4*a* is derived by the information processing device 1 each time the digital output of that piece of accessory equipment 4*a* is updated. A determination record pertaining to each piece of the accessory equipment 4*a* may be included in the monitor information 99. The determination record pertaining to each piece of the accessory equipment 4*a* includes, for example, the number of times the determination result pertaining to that piece of accessory equipment 4*a* has become true.

A configuration of the equipment address map M2 as address information stored in the memory 12 of the information processing device 1 will be described with reference to FIG. 6. FIG. 6 is a diagram illustrating the configuration of the equipment address map M2.

The equipment address map M2 is a table in which word numbers assigned to respective pieces of information included in the equipment data set D2 are associated with addresses on a memory of the PLC 21 provided in the main equipment 2.

The processor 11 of the information processing device 1 reads out pieces of information included in the equipment data set D2 as the configuration information 95, the status information 96, the output information 97, and the monitor information 99 from the memory 12 of the information processing device 1, and writes the information to the memory of the PLC 21 provided in the main equipment 2. At this time, the processor 11 of the information processing device 1 determines, in accordance with the equipment address map M2, a region on the memory of the PLC 21 to which each piece of information is to be written. For example, in the equipment address map M2, a word number S_S_Data+001 is associated with addresses UUU through U'U'U'. Therefore, the processor 11 of the information processing device 1 writes digital output of first accessory equipment, to which the word number S_Data+001 is assigned in the equipment data set D2, to regions to which the addresses UUU through U'U'U' are assigned in the memory of the PLC 21.

In addition, the processor 11 of the information processing device 1 reads out pieces of information included in the equipment data set D2 as the input information 98 from the memory of the PLC 21 provided in the main equipment 2, and writes the read information to the memory 12 of the information processing device 1. At this time, the processor 11 of the information processing device 1 determines, in accordance with the equipment address map M2, a region on the memory of the PLC 21 from which each piece of information is to be read out. For example, in the equipment address map M2, a word number O_Data+001 is associated with addresses WWW through W'W'W'. Therefore, the processor 11 of the information processing device 1 reads out digital input of first accessory equipment, to which the word number O_Data+001 is assigned in the sensor data set D1, from regions to which the addresses WWW through W'W'W' are assigned in the memory of the PLC 21.

The processor 11 of the information processing device 1 may write pieces of equipment data obtained from the pieces of accessory equipment constituting the accessory equipment group 4 to the memory of the PLC 21 provided in the main equipment 2 in accordance with the information processing program P. In this case, address information corresponding to the foregoing equipment address map M2 is included inside the information processing program P.

(Display Method)

Figure 7:
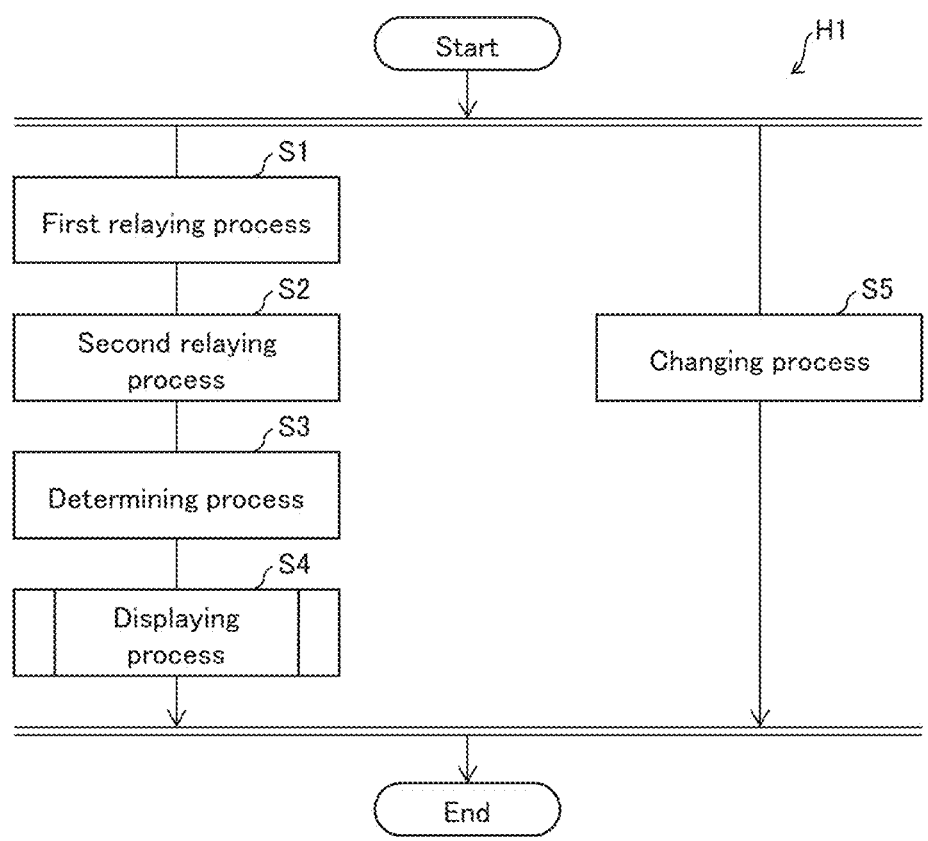
FIG. 7 is a flowchart showing a display method in which the information processing device illustrated in FIG. 1 causes a display device to display data.

A display method H1 for displaying data in the information processing device 1 will be described with reference to FIG. 7. FIG. 7 is a flowchart showing a display method H1 in which the information processing device 1 causes the display device 5 to display data.

The display method H1 for displaying data in the information processing device 1 includes a first relaying process S1, a second relaying process S2, and a displaying process S4 as shown in FIG. 7.

The first relaying process S1 is a process in which the processor 11 of the information processing device 1 obtains sensor data transmitted from each of the sensor slave units 3a constituting the sensor group 3 and the processor 11 provides the sensor data thus obtained to the main equipment 2. In the first relaying process S1, the sensor slave unit 3a transmits sensor data to the sensor master unit 3b periodically or each time a detection value changes. Further, the sensor master unit 3b, periodically or each time the sensor master unit 3b receives sensor data from the sensor slave unit 3a, transmits the sensor data received from the sensor slave unit 3a to the information processing device 1. The processor 11 of the information processing device 1 receives the sensor data transmitted from the sensor slave unit 3a.

In the first relaying process S1, the processor 11 of the information processing device 1 extracts status information and a detection value of the sensor slave unit 3a from the obtained sensor data. In addition, the processor 11 converts the extracted status information and detection value into a format that is interpretable to the PLC 21 of the main equipment 2, and then writes the converted information and value into the memory 12 as the status information 92 and the output information 93 of the sensor data set D1. The processor 11 (1) compares the detection value of the sensor slave unit 3a written to the memory 12 as the output information 93 of the sensor data set D1 with the threshold value written to the memory 12 as the monitor information 94 of the sensor data set D1, and (2) writes a comparison result to the memory 12 as the monitor information 94 of the sensor data set D1. The processor 11 reads out information constituting the status information 92, the output information 93, and the monitor information 94 of the sensor data set D1, and writes the read information to the memory of the PLC 21 provided in the main equipment 2. At this time, the processor 11 of the information processing device 1 determines, with reference to the sensor address map M1, which information is to be written to which region of the memory of the PLC 21.

The second relaying process S2 is a process for obtaining equipment data transmitted from each of the pieces of accessory equipment 4a included in the accessory equipment group 4 and providing the equipment data thus obtained to the main equipment 2. In the second relaying process S2, first accessory equipment 4a1 transmits equipment data to the information processing device 1 periodically or each time the status changes. The processor 11 of the information processing device 1 extracts status information, digital output and analogue output of the first accessory equipment 4a1 from the obtained equipment data. In addition, the processor 11 converts the extracted status information, digital output and analog output into a format that is interpretable to the PLC 21 of the main equipment 2, and then writes the converted information and output to the memory 12 as the status information 96 of the equipment data set D2.

In the second relaying process S2, the processor 11 of the information processing device 1 (1) compares the digital output and/or analog output of the first accessory equipment 4a1 written to the memory 12 as the output information 97 of the equipment data set D2 with the threshold value written to the memory 12 as the monitor information 99 of the equipment data set D2, and (2) writes a comparison result to the memory 12 as the monitor information 99 of the equipment data set D2. The processor 11 reads out pieces of information constituting the status information 96, the output information 97, and the monitor information 99 of the equipment data set D2, and writes the read information to the memory of the PLC 21 provided in the main equipment 2. At this time, the processor 11 of the information processing device 1 determines, with reference to the equipment address map M2, which information is to be written to which region of the memory of the PLC 21.

The determining process S3 is a process for determining whether or not the sensor data and equipment data obtained in the first relaying process S1 and the second relaying process S2 satisfy a particular condition. In the determining process S3, the processor 11 of the information processing device 1 (1) compares the detection value of the sensor slave unit 3a written to the memory 12 as the output information 93 of the sensor data set D1 with the threshold value written to the memory 12 as the monitor information 94 of the sensor data set D1, and (2) writes a comparison result to the memory 12 as the monitor information 94 of the sensor data set D1. The processor 11 (1) compares the digital output and/or analog output of the first accessory equipment 4a1 written to the memory 12 as the output information 97 of the equipment data set D2 with the threshold value written to the memory 12 as the monitor information 99 of the equipment data set D2, and (2) writes a comparison result to the memory 12 as the monitor information 99 of the equipment data set D2.

The displaying process S4 is a process for causing the display device 5 to display at least any of the sensor data obtained in the first relaying process S1, information obtained from the sensor data, the accessory equipment data obtained in the second relaying process S2, and information obtained from the accessory equipment data. In the displaying process S4, the processor 11 of the information processing device 1 read out particular information from among the configuration information 91, the status information 92, the output information 93, and the monitor information 94 of the sensor data set D1 which is stored in the memory 12. The processor 11 generates, from the particular information thus read out, a display screen for displaying the sensor data and/or the information obtained from the sensor data. The processor reads out particular information from among the configuration information 95, the status information 96, the output information 97, and the monitor information 99 of the equipment data set D2 which is stored in the memory 12. The processor 11 generates, from the particular information thus read out, a display screen for displaying the equipment data and/or the information obtained from the equipment data.

In the displaying process S4, the processor 11 of the information processing device 1 outputs the generated display screen to the display device 5. Specific examples of the display screen will be described later with reference to other drawings. The processor 11 causes the display device 5 to display, as an overview screen 110, the sensor data obtained in the first relaying process S1 or information obtained from the sensor data, and the accessory equipment data obtained in the second relaying process S2 or information obtained from the accessory equipment data, simultaneously in a list form (see FIG. 9). The processor 11 causes, for a first sensor slave unit 3a1 selected based on a user operation from among the sensor slave units 3a included in the sensor group 3 displayed on the display screen, the display device 5 to display a sensor screen 120a1 (120) for showing information indicating a status of the first sensor slave unit 3a1 and sensor data transmitted from the first sensor slave unit 3a1 (see FIG. 10). In the displaying process S4, the processor 11 causes, for first accessory equipment 4a1 selected based on a user operation from among the pieces of accessory equipment 4a included in the accessory equipment group 4 displayed on the display screen, the display device 5 to display an accessory equipment screen 130a1 (130) for showing information indicating a status of the first accessory equipment 4a1 and information pertaining to inspection timing obtained from the number of times of operation of the first accessory equipment 4a1 (see FIG. 11).

As illustrated in FIG. 7, the processor 11 of the information processing device 1 may further execute a changing process S5 for changing a condition used for the determining process S3 based on a user operation. In the changing process S5, the processor 11 of the information processing device 1 changes the threshold value stored in the memory 12 as the monitor information 94 of the sensor data set D1 to a value specified by the user. The processor 11 changes the threshold value stored in the memory 12 as the monitor information 99 of the equipment data set D2 to a value specified by the user.

(Screen Transition)

Figure 8:
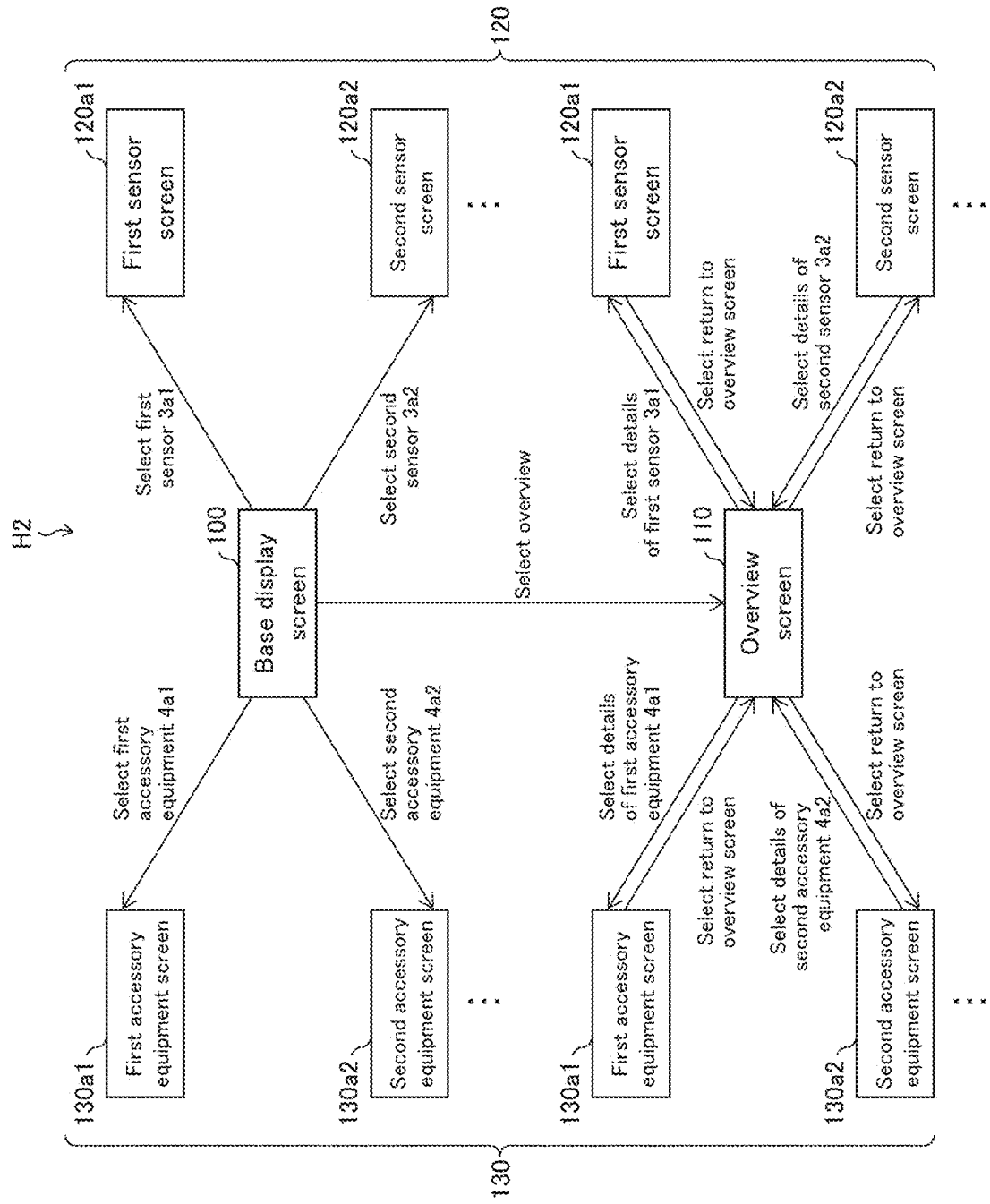
FIG. 8 is a screen transition diagram illustrating a display screen displayed in the displaying process shown in FIG. 7.
Figure 9:
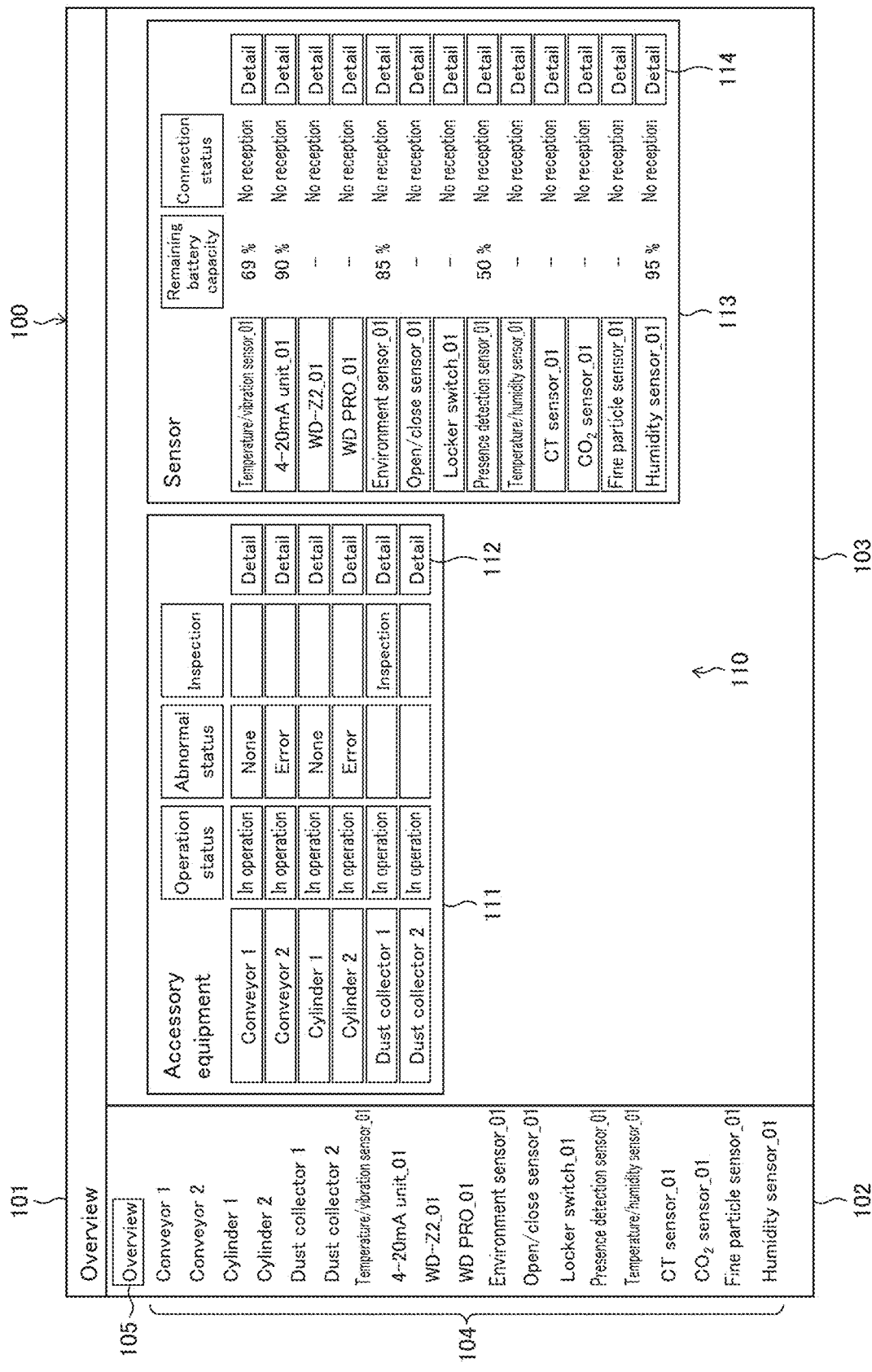
FIG. 9 is a diagram illustrating an example of an overview screen which the information processing device illustrated in FIG. 1 causes the display device to display.
Figure 10:
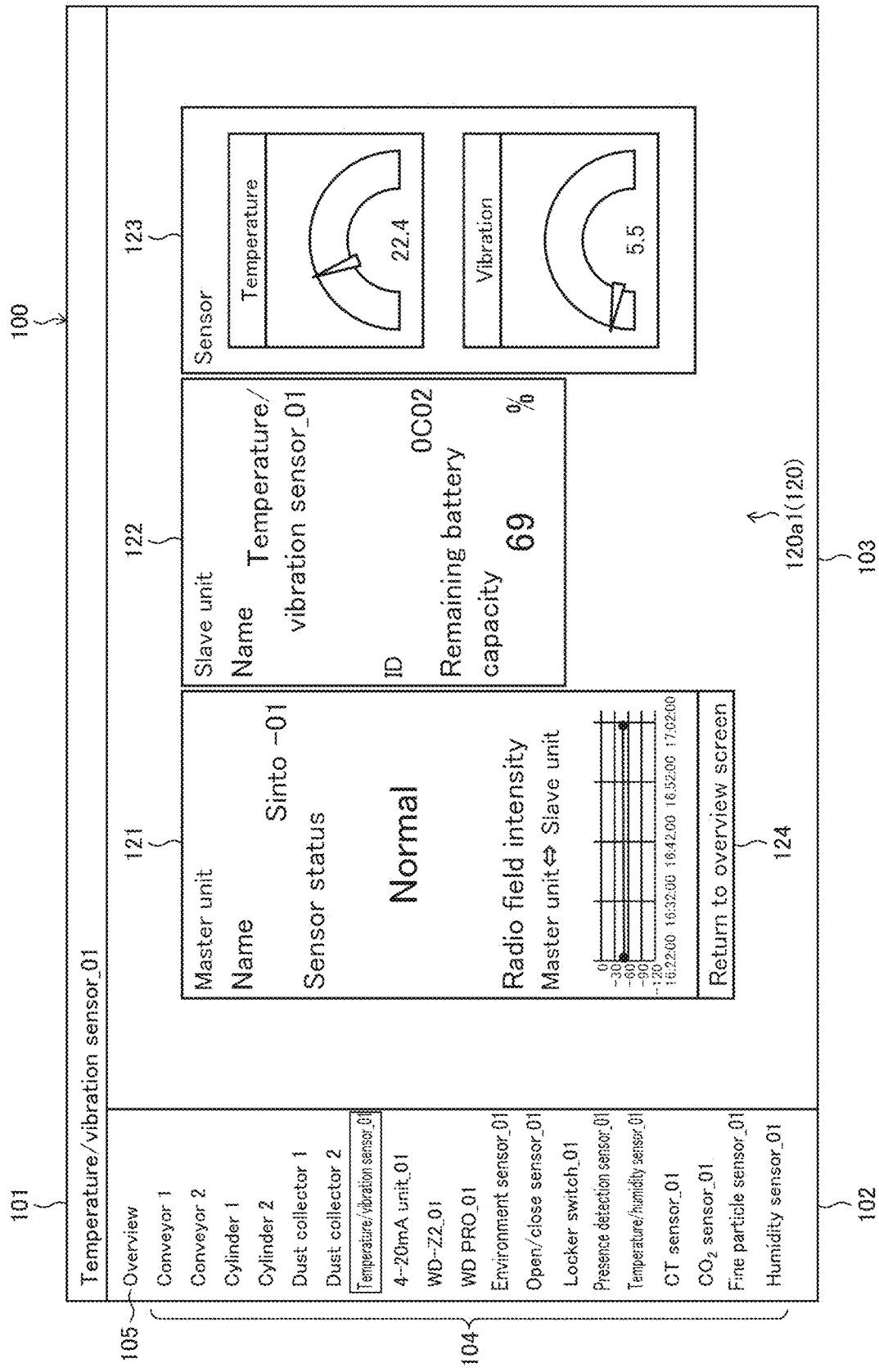
FIG. 10 is a diagram illustrating an example of a sensor screen which the information processing device illustrated in FIG. 1 causes the display device to display.

The following description will discuss a screen transition H2 of a display screen displayed on the display device 5 in the displaying process S4, with reference to FIGS. 8 through 12. FIG. 8 is a screen transition diagram illustrating a display screen displayed in the displaying process S4. FIG. 9 is a diagram illustrating an example of an overview screen 110 which the information processing device 1 causes the display device 5 to display. FIG. 10 is a diagram illustrating an example of a sensor screen 120 which the information processing device 1 causes the display device 5 to display. FIG. 11 is a diagram illustrating an example of an accessory equipment screen 130 which the information processing device 1 causes the display device 5 to display.

As illustrated in FIG. 8, the processor 11 of the information processing device 1 displays a base display screen 100 in the displaying process S4 (see FIG. 9). When an item displayed in a side bar 102 in the base display screen 100 is selected by the user, information pertaining to the selected item is displayed in a data display area 103 of the base display screen 100. For example, when the first sensor slave unit 3a1 is selected from among items in the side bar 102, a sensor screen 120a1 is displayed in which information pertaining to the first sensor slave unit 3a1 is displayed in the data display area 103 (see FIG. 10). Details of the sensor screen 120 will be described later. When the first accessory equipment 4a1 is selected from among the items in the side bar 102, an accessory equipment screen 130a1 is displayed in the data display area 103 (see FIG. 11). Details of the accessory equipment screen 130 will be described later.

When an overview 105 is selected from among the items in the side bar 102, an overview screen 110 is displayed in the data display area 103 (see FIG. 9). Details of the overview screen 110 will be described later. For items of the sensor slave unit 3a displayed in a sensor item 113 displayed in the overview screen 110, respective detail buttons 114 are displayed. When a detail button 114 displayed for the item of the first sensor slave unit 3a1 is selected, the sensor screen 120a1 is displayed in the data display area 103 for showing information pertaining to the first sensor slave unit 3a1. When a return button 124 displayed in the sensor screen 120a1 is selected, the overview screen 110 is displayed in the data display area 103.

For items of each piece of accessory equipment 4a displayed in an accessory equipment item 111 displayed in the overview screen 110, respective detail buttons 112 are displayed. When a detail button 112 displayed for the item of the first accessory equipment 4a1 is selected, an accessory equipment screen 130a1 is displayed in the data display area 103. When a return button 133 displayed in the accessory equipment screen 130a1 is selected, the overview screen 110 is displayed in the data display area 103.

(Examples of Display Screen)

Examples of display screens which the information processing device 1 causes the display device 5 to display will be described with reference to FIGS. 9 through 11.

The base display screen 100 displayed on the display device 5 will be described with reference to FIG. 9. As illustrated in FIG. 9, the processor 11 of the information processing device 1 causes the display device 5 to display the base display screen 100. In the base display screen 100, a title bar 101, the side bar 102, and the data display area 103 are displayed.

In the side bar 102, the sensor slave units 3a and pieces of accessory equipment 4a which are connected to the information processing device 1 and whose data can be displayed are displayed as items 104. In the side bar 102, the overview 105 is also displayed as an item for displaying, in the data display area 103, pieces of data related to all the sensor slave units 3a and pieces of accessory equipment 4a displayed in the side bar 102. In the title bar 101, a name of an item selected based on a user operation in the side bar 102 is displayed. In the data display area 103, data of the item selected by the user in the side bar 102 is displayed.

The overview screen 110 displayed on the display device 5 will be described with reference to FIG. 9. When the item of the overview 105 is selected in the side bar 102, the overview screen 110 is displayed in the data display area 103 as illustrated in FIG. 9. In the overview screen 110, the accessory equipment item 111 for displaying information pertaining to all the pieces of accessory equipment 4a displayed in the side bar 102, and the sensor item 113 for displaying information pertaining to all the sensor slave units 3a displayed in the side bar 102 are displayed.

As the information pertaining to the sensor slave unit 3a displayed in the sensor item 113, status information (a remaining battery capacity and a communication status in the example illustrated in FIG. 9) of the sensor slave unit 3a is displayed. The remaining battery capacity is displayed as a numerical value in the sensor item 113. The communication status displayed in the sensor item 113 is indicated as, for example, (1) sensor master unit abnormality, (2) sensor slave unit abnormality, (3) radio wave caution, or (4) normal. The displayed communication status can indicate a status of information by changing a color of character. For example, a normal status may be indicated in a cold color, and an abnormality status may be indicated in a warm color. For items of the sensor slave unit 3a displayed in the sensor item 113, the respective detail buttons 114 are displayed. When a detail button 114 displayed for an arbitrary sensor slave unit 3a is selected by the user, the sensor screen 120 is displayed in the data display area 103 for indicating information pertaining to the selected sensor slave unit 3a (see FIG. 10).

As the information pertaining to the accessory equipment 4a displayed in the accessory equipment item 111, an operation signal of the accessory equipment 4a (indicators showing whether or not the equipment is in operation, and whether or not the equipment is in abnormal operation in the example illustrated in FIG. 9) and monitor information of the accessory equipment 4a (indicator showing replacement information in the example illustrated in FIG. 9) are displayed. When the selected first accessory equipment 4a1 is in operation, an indicator of "in operation" is displayed for the item of the first accessory equipment 4a1 and, when the first accessory equipment 4a1 is stopped, an indicator of "stopped" is displayed. When the selected first accessory equipment 4a1 is in abnormal operation, an indicator of "in abnormal operation" is displayed. When the selected first accessory equipment 4a1 is not in abnormal operation, the indicator of "in abnormal operation" is not displayed. For the items of the accessory equipment 4a displayed in the accessory equipment item 111, the respective detail buttons 112 are displayed. When a detail button 112 displayed for arbitrary accessory equipment 4a is selected by the user, the accessory equipment screen 130 is displayed in the data display area 103 for indicating information pertaining to the selected accessory equipment 4a (see FIG. 11).

The sensor screen 120 displayed on the display device 5 will be described with reference to FIG. 10. When an item of each of the sensor slave units 3a displayed in the side bar 102 or a detail button 114 displayed in the overview screen 110 is selected by a user operation, the sensor screen 120 is displayed in the data display area 103 as illustrated in FIG. 10. As an example, a sensor screen 120a1 displayed when the first sensor slave unit 3a1 is selected will be described. In the sensor screen 120a1, master unit information 121 indicating information pertaining to the sensor master unit 3b connected with the selected first sensor slave unit 3a1, sensor slave unit information 122 indicating information pertaining to the selected first sensor slave unit 3a1, and reception data 123 indicating data detected by the selected first sensor slave unit 3a1 are displayed.

In the master unit information 121, a name of a sensor master unit 3b, a communication status between the sensor master unit 3b and the information processing device 1, and a communication status between the sensor master unit 3b and the sensor slave unit 3a as information pertaining to the sensor master unit 3b are displayed. The communication status between the sensor master unit 3b and the information processing device 1 is indicated as, for example, (1) sensor master unit abnormality, (2) sensor slave unit abnormality, (3) radio wave caution, or (4) normal. The displayed communication status can indicate a status of information by changing a color of character. The communication status between the sensor master unit 3b and the sensor slave unit 3a is displayed as a graph so that communication statuses in the past can be seen. In a lower part of the master unit information 121, the return button 124 is displayed. When the return button 124 is selected, the overview screen 110 is displayed which was displayed before the sensor screen 120 is displayed.

In the sensor slave unit information 122, a name of the first sensor slave unit 3a1, ID of the first sensor slave unit 3a1, and a remaining battery capacity of the first sensor slave unit 3a1 are displayed as information pertaining to the sensor slave unit 3a. The remaining battery capacity is displayed as a numerical value. The remaining battery capacity can be displayed in colors that change in accordance with a remaining capacity of a battery. For example, a sufficient remaining battery capacity may be indicated in a cold color, and a low remaining battery capacity may be indicated in a warm color.

In the reception data 123, a detection value detected by the first sensor slave unit 3a1 is displayed. In the reception data 123, a displaying manner varies in accordance with data detected by the selected sensor slave unit 3a. In the example illustrated in FIG. 10, a detection value related to a temperature is displayed as a semicircular gauge and a numerical value, and a detection value related to vibration is displayed as a semicircular gauge and a numerical value. As another example, a lamp displayed on the display screen may be turned on when the open/close sensor is ON, and the lamp may be turned off when the open/close sensor is OFF.

The accessory equipment screen 130 displayed on the display device 5 will be described with reference to FIG. 11. When an item of accessory equipment 4a displayed in the side bar 102 or a detail button 112 displayed in the overview screen 110 is selected by a user operation, the accessory equipment screen 130 is displayed in the data display area 103 as illustrated in FIG. 11. As an example, the following description will discuss a case in which the first accessory equipment 4a1 is selected. In the accessory equipment screen 130, accessory equipment information 131 indicating a status of the first accessory equipment 4a1, and replacement information 132 indicating information pertaining to replacement timing obtained from the number of times of operation of the first accessory equipment 4a1 are displayed.

In the accessory equipment information 131, an image of the first accessory equipment 4a1, an operation status of the first accessory equipment 4a1, and information indicating an abnormal operation status of the first accessory equipment 4a1 are displayed. In the operation status of the first accessory equipment 4a1, an indicator showing whether or not the equipment is in operation is displayed. When the first accessory equipment 4a1 is in operation, an indicator of "in operation" is displayed and, when the first accessory equipment 4a1 is stopped, an indicator of "stopped" is displayed.

In the abnormal operation status of the first accessory equipment 4a1, an indicator showing whether or not the equipment is in abnormal operation is displayed. When the first accessory equipment 4a1 is in abnormal operation, an indicator showing "abnormal operation" is displayed and, when the first accessory equipment 4a1 is in normal operation, the indicator is not displayed. In a lower part of the accessory equipment information 131, a return button 133 is displayed. When the return button 133 is selected, the overview screen 110 is displayed which was displayed before the accessory equipment screen 130 is displayed.

In the replacement information 132, information indicating whether or not inspection is necessary, a predetermined number of times of operation of the first accessory equipment 4a1 at which it is determined that inspection is necessary, and the current number of times of operation of the first accessory equipment 4a1 are displayed. When the current number of times of operation of the first accessory equipment 4a1 exceeds the predetermined set number of times, it is displayed that inspection is necessary as the information indicating whether or not inspection is necessary. In a lower part of the replacement information 132, a set number changing button 134 is displayed. With the set number changing button 134, the user can change the predetermined set number of times for the first accessory equipment 4a1.

(Additional Remarks)

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: Information processing device
2: Main equipment
3: Sensor group
3a: Sensor slave unit
3b: Sensor master unit
4: Accessory equipment group
5: Display device

The invention claimed is:

1. An information processing device configured to relay communication between each sensor included in a sensor group and main equipment, and relay communication between each piece of accessory equipment included in an accessor equipment group and the main equipment, comprising:
  at least one processor, the at least one processor configured to execute
  a first relaying process for obtaining sensor data transmitted from each sensor included in the sensor group and providing the sensor data obtained to the main equipment,
  a second relaying process for obtaining accessory equipment data transmitted from each piece of accessory equipment included in the accessory equipment group and providing the accessory equipment data obtained to the main equipment, the accessory equipment data being different from the sensor data, and
  a displaying process for causing a display device to display at least one of the sensor data obtained in the first relaying process, information obtained from the sensor data obtained, the accessory equipment data obtained in the second relaying process, or information obtained from the accessory equipment data obtained.

2. The information processing device as set forth in claim 1, wherein
  in the displaying process, the at least one processor is configured to cause the display device to display information indicating a status of a sensor selected from among the sensors included in the sensor group based on a user operation and to display the sensor data transmitted from the sensor selected.

3. The information processing device as set forth in claim 1, wherein in the displaying process, the at least one processor is configured to cause the display device to
  display information indicating a status of a piece of accessory equipment selected from among the pieces of accessory equipment included in the accessory equipment group based on a user operation, and
  display information pertaining to inspection timing that is obtained from the number of times of operation of the piece of accessory equipment selected.

4. The information processing device as set forth in claim 1, wherein in the displaying process, the at least one processor is configured to cause the display device to
  display, simultaneously in a list form, the sensor data obtained in the first relaying process or the information obtained from the sensor data obtained and the accessory equipment data obtained in the second relaying process or the information obtained from the accessory equipment data obtained.

5. The information processing device as set forth in claim 1, wherein
  the at least one processor is configured to execute a determining process for determining whether or not the sensor data obtained in the first relaying process satisfies a first condition and the accessory equipment data obtained in the second relaying process satisfies a second condition, and
  in the displaying process, the at least one processor is configured to cause the display device to display an error based on a result of the determining process.

6. The information processing device as set forth in claim 5, wherein the at least one processor is configured to execute a changing process for changing each of the first condition and the second condition based on a user operation.

7. An information processing method configured to relay communication between each sensor included in a sensor group and main equipment, and relay communication between each piece of accessory equipment included in an accessory equipment group and the main equipment, comprising:
  a first relaying process for obtaining, by at least one processor, sensor data transmitted from each sensor included in the sensor group and providing, by the at least one processor, the sensor data obtained to the main equipment;
  a second relaying process for obtaining, by the at least one processor, accessory equipment data transmitted from each piece of accessory equipment included in the accessory equipment group and providing, by the at least one processor, the accessory equipment data obtained to the main equipment, the accessory equipment date being different from the sensor data; and
  a displaying process for causing, by the at least one processor, a display device to display at least one of the sensor data obtained in the first relaying process or information obtained from the sensor data obtained and the accessory equipment data obtained in the second relaying process or information obtained from the accessory equipment data obtained.

8. The information processing device of claim 1, wherein each of the sensors included in the sensor group is positioned separately from the information processing device.

9. The information processing device of claim 8, wherein each sensor included in the sensor group includes a plurality of sensor slave units and a sensor master unit, the sensor master unit being configured to relay communication between the plurality of sensor slave units and the information processing device, and the sensor master unit is connected to the information processing device via a wired connection.

10. The information processing device of claim 1, wherein each piece of accessory equipment included in the accessory equipment group is connected to the information processing device via a wired connection.

11. The information processing device of claim 10, wherein each piece of accessory equipment included in the accessory equipment group includes a control section, and each of the control sections is configured to control an operation of the respective piece of accessory equipment.

12. The information processing device of claim 1, further comprising:

a memory, wherein in the first relaying process, the at least one processer is congaed to cause the sensor data obtained to be stored in the memory, and provide the sensor data obtained to the main equipment from the memory, and in the second relaying process, the at least one processor is configured to cause the accessory equipment data obtained to be stored in the memory, and provide the accessory equipment data obtained to the main equipment from the memory.

* * * * *